J. F. APPLEGATE.
Dumping Wagon.
No. 83,900.    Patented Nov. 10, 1868.
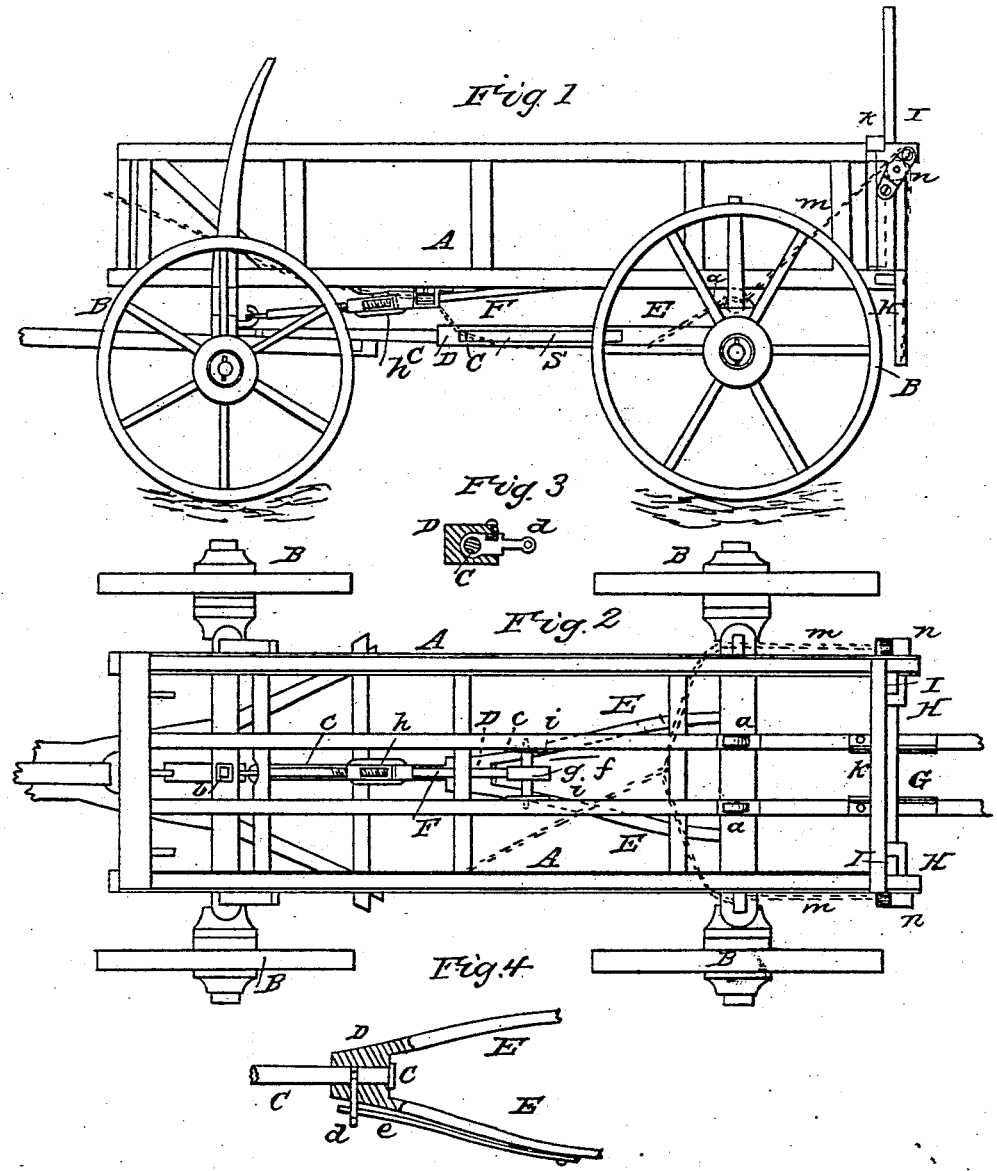

United States Patent Office.

JOSEPH F. APPLEGATE, OF NEW ALBANY, INDIANA.

*Letters Patent No. 83,900, dated November 10, 1868.*

IMPROVEMENT IN WAGONS.

The Schedule referred to in these Letters Patent and making part of the same.

*To all whom it may concern:*

Be it known that I, JOSEPH F. APPLEGATE, of New Albany, in the county of Floyd, and in the State of Indiana, have invented certain new and useful Improvements in Wagons; and do hereby declare that the following is a full, clear, and exact description thereof, reference being had to the accompanying drawings, and to the letters of reference marked thereon.

The nature of my invention consists in the mode of coupling, in the adjustment of the tail-gate of the bed, and in the mode of loading and unloading the wagon.

In order to enable others skilled in the art to make and use my invention, I will now proceed to describe its construction and operation, referring to the annexed drawings, which form a part of this specification, and in which—

Figure 1 is a side view.

Figure 2, a plan view.

Figures 3 and 4, sections of the coupling, showing the key and shaft.

A represents the bed of a wagon, made of any matererial and dimensions suitable, and which is mounted on four wheels, B B, the same as any other wagon, but the rear end thereof rests on rollers, $a\ a$, on the upper side of the rear bolster.

The perch-pole C is round, except at the forward end, through which the king-bolt $b$ passes, the rear end of said perch-pole passing through a sheath, D, which may be arranged between, beneath, or above the hounds E E, with an adjustable nut, $c$, on its end, behind said sheath, so as to prevent the perch-pole from being pulled through the sheath. The perch-pole C is further provided with key-seats, into which a coupling-bolt, $d$, may pass through one side of the hounds, and thus render the perch-pole immovable.

Upon one of the hounds, E, is adjusted a spring, $e$, through which the coupling-bolt $d$ passes before passing through the hound and into said key-seat, and which spring is so adjusted to said bolt as to hold the same in the key-seat on the perch-pole $c$, as shown in figs. 3 and 4, but which may, by any means suitable, be pulled outward, moving the bolt $d$ from said key-seat, thus leaving the perch-pole C free to pass backward and forward, through the sheath D, at the will of any person having control of the wagon, and which, at his will, carries the bolt back into the key-seat, rendering the perch-pole immovable.

Between the two inner rails of the bed A, at any desired distance, is adjusted a roller, $f$, of any desired material, working in boxes, $i\ i$, to which is attached the end of a coupling-rod, F, by means of a yoke, $g$, which allows it to move freely upon said roller or shaft $f$, in the tilting of the bed.

This rod, F, at its forward end, is fastened to the sand-board, or to the king-bolt $b$, thereby coupling the bed A to the forward wheels, and allowing it to tilt as the wheels are pushed backwards, and pulling it into its place as they are pulled forward, avoiding any upward extension of the king-bolt. The rod F is made in two pieces, which are connected by a screw-swivel, $h$, by means of which said rod may be lengthened or shortened, as desired.

The tail-gate G, of the bed A, is adjusted thereto by slides, H H, fastened to the tail-gate, and extending any desired distance below, working upon pieces, I I, adjusted to the sides of the bed, and extending any desired distance above, thus allowing the said gate to move freely up and down.

To the lower end of each slide, H H, is adjusted a rope or chain, $m$, which passes from thence, upward and over pulleys $n\ n$, fastened to the sides of the bed, near the top, thence forward of the rear axle, coupling beneath the hounds, or the ends of each may be fastened by any means to the rear bolster, or the standards thereof, so that when the bed A is tilted, the gate G is raised, thus enabling the load to be dumped, and drops again into its place when the bed is tilted forward.

To the top of the gate is adjusted a strap, $k$, of any material, with a hook at each end, turned downward, of such length as to enable them to drop over the top of the sides of the bed as the gate drops into its place, thus firmly holding them together.

Having thus fully described my invention,

What I claim as new, and desire to secure by Letters Patent, is—

1. The arrangement of the coupling-rod F, made in two pieces, connected by a screw-swivel, $h$, and attached at the front end, either to the sand-board or to the king-bolt, and at the rear end provided with a yoke, $g$, which moves freely around the roller or shaft $f$, in boxes $i\ i$, on the inner sides of the two middle rails of the frame A, as and for the purposes herein set forth.

2. The tail-gate G, provided with a strap, $k$, across its upper end, and with slides, H H, extending below the wagon, which work on pieces, I I, on the inner side of the frame A, substantially as and for the purposes herein set forth.

3. The arrangement of the spring-bolts $e\ d$ in combination with the perch-pole C, sheath D, and hounds E E, all constructed and operating substantially as and for the purposes herein set forth.

In testimony that I claim the foregoing, I have hereunto set my hand, this 25th day of June, 1868.

JOSEPH F. APPLEGATE.

Witnesses:
A. N. MARR,
LEOPOLD EVERT.